United States Patent
Takano et al.

(10) Patent No.: US 8,059,295 B2
(45) Date of Patent: Nov. 15, 2011

(54) MULTI-FUNCTION IMAGE PROCESSING APPARATUS AND METHOD

(75) Inventors: Gaku Takano, Kanagawa-ken (JP); Hiroki Kanno, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 330 days.

(21) Appl. No.: 12/248,636

(22) Filed: Oct. 9, 2008

(65) Prior Publication Data

US 2009/0027713 A1    Jan. 29, 2009

Related U.S. Application Data

(63) Continuation of application No. 10/612,952, filed on Jul. 7, 2003, now Pat. No. 7,443,526.

(51) Int. Cl.
*H04N 1/04* (2006.01)
(52) U.S. Cl. .................. 358/1.15; 358/474; 358/448
(58) Field of Classification Search .............. 358/1.15, 358/474, 448
See application file for complete search history.

(56) References Cited

U.S. PATENT DOCUMENTS

| | | |
|---|---|---|
| 5,233,335 A | 8/1993 | Berwin |
| 6,655,676 B2 | 12/2003 | Nishimura |
| 2003/0122881 A1 | 7/2003 | Yoshida |
| 2003/0164988 A1 * | 9/2003 | Enomoto et al. .............. 358/400 |
| 2004/0013317 A1 | 1/2004 | Eschbach et al. |
| 2004/0042474 A1 | 3/2004 | Walker et al. |

FOREIGN PATENT DOCUMENTS

| | | |
|---|---|---|
| JP | 04-321127 | * 11/1992 |
| JP | 10-269044 A | 10/1998 |

OTHER PUBLICATIONS

Y. Shiraishi et al., "Multi-function Technology for FAX/MFP Devices", OKI Technical Review, Special Issue on Printers, vol. 64, Aug. 1998, pp. 81-84.

* cited by examiner

*Primary Examiner* — Houshang Safaipour
(74) *Attorney, Agent, or Firm* — Foley & Lardner LLP (57) ABSTRACT

A multi-function image processing apparatus includes a system control unit that receives an image processing job sent over a network by a requesting device, and that controls operation of the image processing apparatus. The apparatus includes an image recording unit that performs a printing operation. The apparatus also includes a scanner that scans data provided to the apparatus. The apparatus further includes an image processing unit that receives scan data from the scanner, that performs image processing on the scan data, and that outputs image-processed scan data to the image recording unit for printing of the image-processed scan data. The apparatus also includes an interface unit that transfers image data between the image processing unit and the system control unit in at least one mode of operation of the image processing apparatus. The image processing unit includes a first FIFO and a second FIFO for bypassing the interface unit under certain situations.

6 Claims, 6 Drawing Sheets

MULTI-FUNCTION IMAGE PROCESSING APPARATUS AND METHOD

The present application is a continuation of U.S. application Ser. No. 10/612,952, filed Jul. 7, 2003, the entire contents of which is incorporated herein by reference.

FIELD OF THE INVENTION

The present invention relates generally to a multi-function peripheral (MFP), and in particular it relates to an MFP that has a separate function to handle image processing jobs received over a network connection.

BACKGROUND OF THE INVENTION

A multi-function peripheral (also sometimes referred to as a multi-function product or MFP) is a peripheral equipment of a personal computer (PC) that has multiple functions in one unit. A user of the PC can utilize the MFP to scan, copy or print documents. The PC user normally accesses the MFP in one of two ways: a) physically placing a document on an imaging area of the MFP and requesting a particular function by activating an appropriate button on the MFP's control panel (e.g., "Print", "Copy", or "Scan"), or b) by sending image data to the MFP over a network connection, including commanding the MFP to carry out a particular function with the image data received over the network. However, in conventional MFPs, such data received over the network cannot be image processed in an expeditious manner, but rather is handled by various MFP components acting simply as a "pass through" for the electronic document data while it passes to or from the MFP image processing component.

Figure 1:
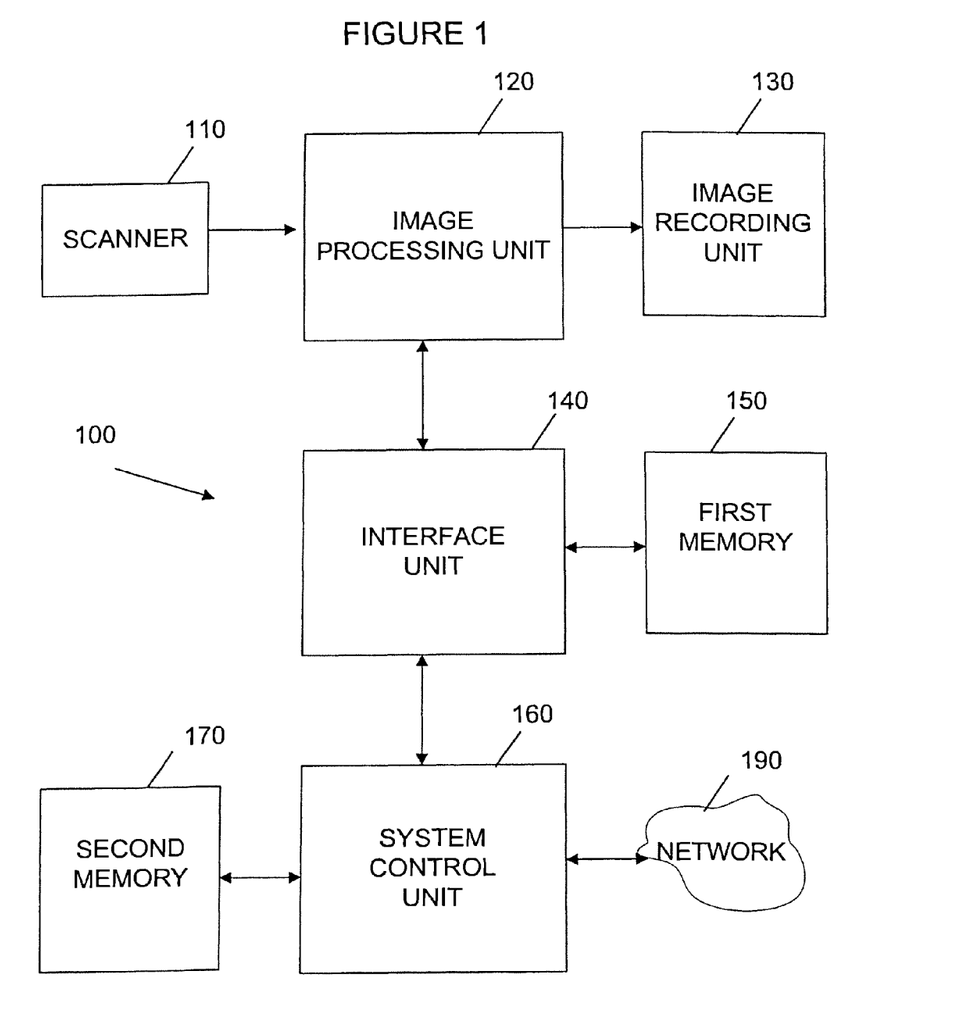
FIG. 1 is a block diagram of a conventional MFP.

FIG. 1 is a block diagram showing the major elements of a conventional MFP 100. The MFP 100 includes a scanner 110, an image processing unit or processor 120, an image recording unit or recorder 130, an interface unit 140, a first memory 150, a system control unit or controller 160, and a second memory 170.

The scanner 110 scans images and outputs digital image data. The scanner 110 typically has an image sensor to read documents placed on an imaging area, and it may also have an automatic paper feed mechanism to feed multiple pages of a document in a continuous manner. Commercially-available scanners can have other conventional functions, as understood in the art.

The image processing unit 120 receives the digital image data output by the scanner 110 or data received from the interface unit 140, converts the image data to electrical data, which is provided to the image recording unit 130 such as to print the document. Alternatively, the scan data output by the scanner 110 may be stored in the first memory 150, after having passed through the image processing unit 120 and the interface unit 140.

The image processing unit 120 includes image processing components that compensate the data to obtain optimum images, and thereby the image processing unit 120 is capable of performing image processing on the data that it receives. As an example only, such image processing components may perform binarization, filtering, matrix conversion, gamma correction, compression, decompression, half-toning, and/or under-color removal (UCR) on the received data. The image processing unit 120 provides image-processed data to the image recording unit 130, and/or to the interface unit 140.

The image recording unit 130 prints the image-processed data received from the image processing unit 120. As an example only, the image recording unit 130 may correspond to an ink-jet printer or a laser printer.

For the conventional MFP 100, the scanner 110, the image processing unit 120 and the image recording unit 130 are principally used for copying. These components are typically synchronized to each other to allow the scanning, image processing and copying processes to be carried out at a very high data rate.

The interface unit 140 assists in data and control signal transfer among the various components of the MFP 100. In particular, for example, the interface unit 140 provides for data transfer between the system control unit 160, the first memory 150, and the image processing unit 120. The interface unit 140 may be a bus or a North bridge, for example.

Typically, the first memory 150 is a page memory and is implemented as a random access memory (PAM). The first memory 150 stores data, in units of a page, to be transferred to the image processing unit 120, or it stores data that is received from the image processing unit 120. The first memory 150 is typically implemented as a volatile memory (e.g., synchronous dynamic RAM).

Figure 2:
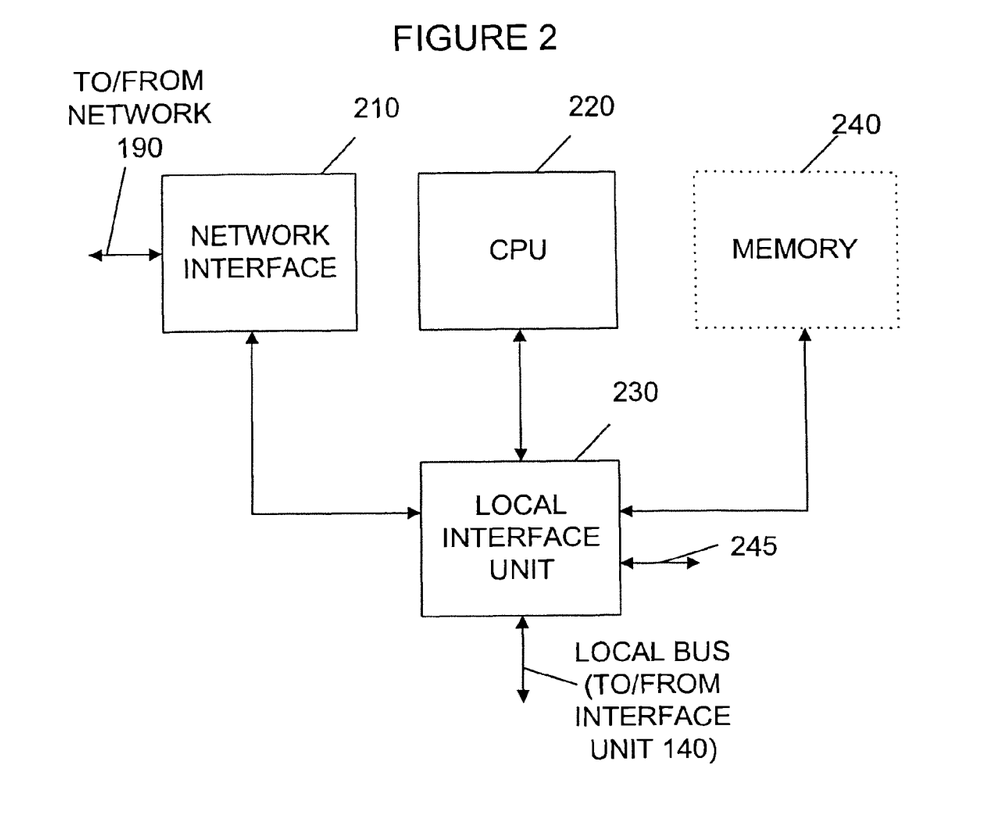
FIG. 2 is a block diagram of an image processing unit of a conventional MFP.

The system control unit 160 controls various components of the MFP 100. FIG. 2 shows one possible implementation of the system control unit 160. The system control unit 160 includes a network interface 210, a central processing unit (CPU) 220, a local interface unit 230 (which may be implemented, for example, as a bus or a North bridge), a PCI bus 245 (for data transfer to/from the second memory 170), and a memory 240. Memory 240 is indicated as an optional component shown by dashed lines in FIG. 2. The network interface 210 provides the interface for data received from or to be sent over a network 190 (see FIG. 1), and it may include, for example, an IEEE 1284 (parallel interface), a local area network (LAN) interface and/or a high-speed serial interface.

The second memory 170 is communicatively coupled to the system control unit 160 by way of a bus, such as the PCI bus 245 as shown in FIG. 2. The second memory 170 is typically implemented as a hard disk drive (HDD), and is used to store image data that has been scanned by the MFP 100, for example, and whereby that scanned data can be later retrieved from the second memory 170 to be sent to the image recording unit 130 (for printing) or to a PC (over the network 190). The second memory 170 is typically implemented as a non-volatile memory.

Three processes that the conventional MFP 100 normally performs are "Copy," "Scan," and "Print." First, as to the "Copy" process, it proceeds as follows: Scanner 110→Image Processing Unit 120→Interface Unit 140→First Memory 150→Interface Unit 140→System Control Unit 160→Second Memory 170→System Control Unit 160→Interface Unit 140→First Memory 150→Interface Unit 140→Image Processing Unit 120→Image Recording Unit 130.

In more detail, in a "Copy" operation, the scanner 110 scans a document, and the output of the scanner 110 is provided to the image processing unit 120, which performs a desired image processing (e.g., filtering, color conversion, gamma correction, compression) on the scan output. The image processed output is provided to the interface unit 140, for transfer to the first memory 150, and is stored in units of a page. The image data stored in the first memory 150 is transferred back to the interface unit 140, then to the image processing unit 120, and then to the image recording unit 130 for printing.

The second process performed by the MFP 100 is the "Scan" process, which proceeds as follows: Scanner 110→Image Processing Unit 120→Interface Unit 140→First Memory 150→Interface Unit 140→System Control Unit 160→Second Memory 170. This corresponds to a first part of the "Copy" process described above.

The third process normally performed by the MFP 100 is the "Print" process. The "Print" process proceeds as follows: Second Memory 170→System Control Unit 160→Interface Unit 140→First Memory 150→Interface Unit 140→Image Processing Unit 120→Image Recording Unit 130. This corresponds to a second part of the "Copy" process described above.

Japanese Laid-Open Patent Application 10-269044 describes an MFP that has network accessible functions. However, like the MFP 100 shown in FIG. 1, the MFP described in Japanese Laid-Open Patent Application 10-269044 cannot process image data received over the network and send it back over a network in a simple and direct manner, without passing the data through several MFP components that do not manipulate the image data in any way. This wastes valuable resources of the MFP, and is inefficient.

Thus, it is desirable to provide another process for an MFP that allows it to efficiently and effectively process image data received over a network, and to send the processed image data back over to the network to a requesting device (i.e., PC), whereby the process path of the MFP reduces or eliminates passing through components of the MFP that do not manipulate the image data in any meaningful way.

SUMMARY OF THE INVENTION

Briefly, in one aspect of the invention, a multi-function image processing apparatus (MFP) includes a system control unit that is communicatively coupled to a network and that is configured to receive an image processing job sent over the network by a requesting device, and to control operation of the MFP. The MFP also includes an image recording unit configured to print documents based on image data received by the image recording unit. The MFP further includes a scanner configured to scan a physical document, and to provide scan data as a result. The MFP also includes an image processing unit configured to receive the scan data from the scanner, to perform image processing on the scan data, and to output image-processed scan data to the image recording unit for printing of the image-processed scan data. The image processing unit includes a first FIFO that is communicatively coupled to the system control unit and that is configured to receive image data to be image-processed an image processing component of the image processing unit to thereby provide image-processed data. The image processing unit further includes a second FIFO that is communicatively coupled to the system control unit and that is configured to send image-processed data of the image processing unit to the system control unit, so that the system control unit can transfer the image-processed data over the network to the requesting device.

DETAILED DESCRIPTION OF THE PREFERRED EMBODIMENTS

Figure 3:
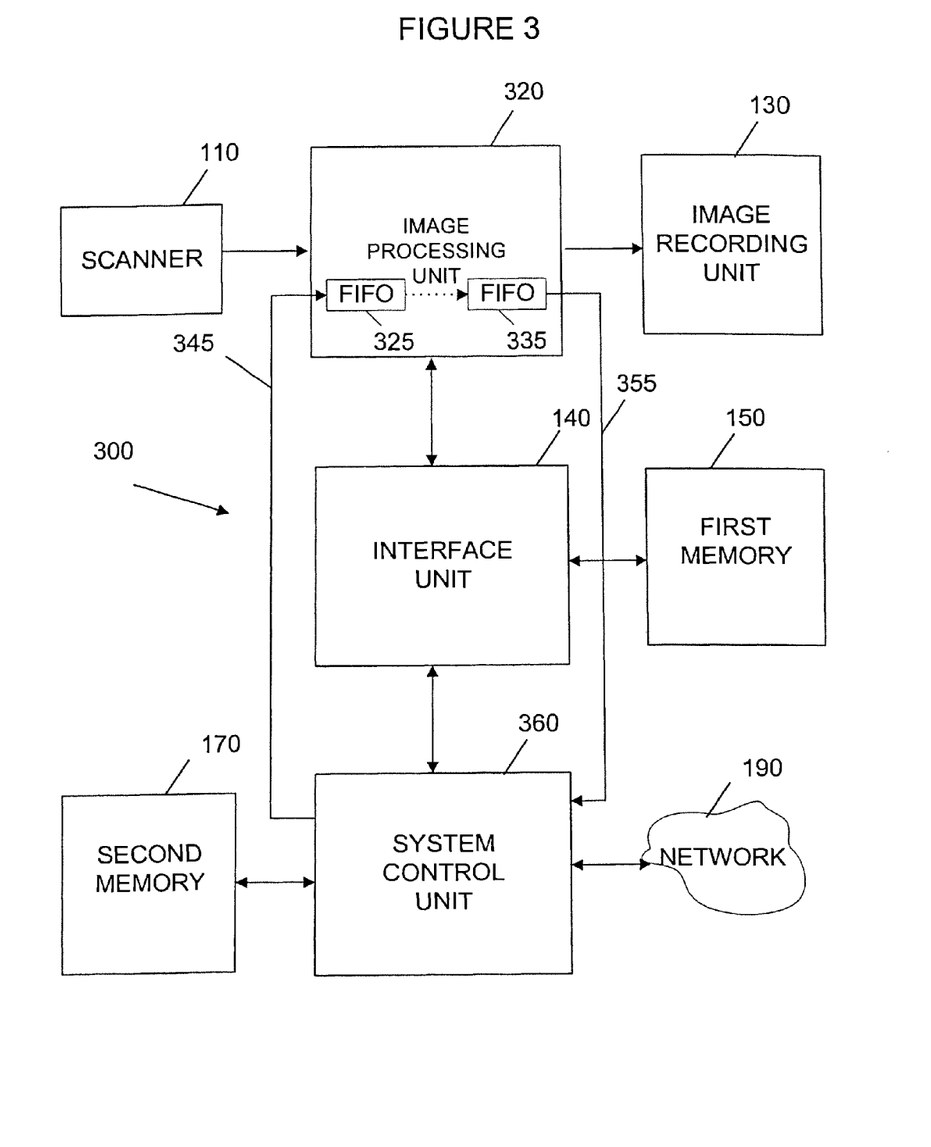
FIG. 3 is a block diagram of an MFP according to a first embodiment of the invention.

An MFP according to a first embodiment of the invention is shown in FIG. 3. The MFP 300 includes a scanner 110, an image recording unit or recorder 130, an interface unit 140, a first memory 150, and a second memory 170. These components are the same as those shown in FIG. 1 with respect to the conventional MFP 100, and thus are given the same reference numerals. The MFP 300 according to the first embodiment also includes an image processing unit or processor 320, which differs from the image processing unit 120 of the conventional MFP 100. Also, the system control unit or controller 360 differs from the conventional system control 160, in that system control unit 360 provides different control signals (e.g., freeze, unfreeze) than system control unit 160 of FIG. 1 outputs.

In more detail, the image processing unit 320 includes all of the features of the image processing unit 120, and further includes an input FIFO ("first-in-first-out") 325 and an output FIFO 335. The input FIFO 325 and the output FIFO 335 are synchronized (clocked) to the same clock as the scanner 110, the image recording unit 130, and the other components making up the MFP 300.

The input FIFO 325 and the output FIFO 335 operate to store images on each line of data, and the input FIFO 325 and the output FIFO 335 are directly connected to the system control unit 360 via a first bus 345 and a second bus 355, respectively. The input FIFO 325 receives image data send from the system control unit 160 via the first bus 345, image data that the image processing unit 320 needs to process. The output FIFO 335 sends image-processed data one line at a time to the system control unit 360 via the second bus 355, after the image data has been processed in the desired manner. The system control unit 360 receives data to be image processed over the network 190, and sends the image-processed data (that it receives from the output FIFO 335) over the network 190 to the device (e.g., PC) that sent data to be image processed by the MFP 300.

The MFP 300 according to the first embodiment provides either a "Scan", "Copy" and "Print" process, just like the conventional MFP 100. For these processes, data input to the image processing unit 320 need not pass through the input FIFO 325, and data output from the image processing unit 320 need not pass through the output FIFO 335. The MFP 300 further provides a fourth process that cannot be performed by the conventional MFP 100. The fourth process allows the MFP 300 to image process data received over the network 190, without requiring that data to pass through MFP components that do not process or otherwise operate on the data. For the fourth process, data input to the image processing unit 320 passes through the input FIFO 325, and data output from the image processing unit 320 passes through the output FIFO 335.

The fourth process is useful for network devices since PCs typically are capable of performing some amount of image processing capability via application programs running on the PCs, but an MFP, which is accessible over a network, is capable of performing a better quality image conversion and can do it in a shorter amount of time, by way of the fourth process.

By way of the input FIFO 325 and the output FIFO 335, a bypass path is provided in the MFP 300 to allow the MFP 300 to readily process data received from the network 190, and send that data back over the network 190 to a device (e.g., PC). For example, a PC can send raw image (e.g., tiff) data over the network 190 to the MFP 300 to have the MFP 300 process that data into JPEG data. The fourth process of the MFP 300 is utilized to perform this data conversion. Also, a PC can send 24-bit full color data over the network 190 to the MFP 300 so that the MFP 300 can process that data into binary black-and-white image data. Many other applications and types of image processing that utilize the fourth process of the MFP 300 can be envisioned, all of which are within the spirit and scope of the invention.

The fourth process bypasses the interface unit 140 and the first memory 150 of the MFP 300, which components simply act as a "pass through" for image data on its way to and from the image processing unit 320.

When the system control unit 360 receives image data sent over the network 190 (such as by a PC communicatively coupled to the network 190) to be processed by the MFP 300 in some manner by way of the fourth process, the system control unit 360 provides that image data to the input FIFO 325. The input FIFO 325 clocks in that image data, one line at a time, and the image data read into the input FIFO 325 is clocked out of the input FIFO 325 one line at a time (or another appropriate amount of data), to then be image-processed in some manner by particular image processing components of the image processing unit 320. For example, the image processing unit 320 may have separate components for respectively performing binarization, filtering, compression, or decompression of the data, just to name a few types of processing that the image processing unit 320 is capable of performing.

After the image processing unit 320 finishing image processing one line of data provided by the input FIFO 325, that one line of data is clocked into the output FIFO 335, whereby it is output to the system control unit 360, one line at a time.

The system control unit 360 may store the image-processed data in the second memory 170, to be sent to a requesting PC at a later time (e.g., when all of the data to be image-processed has been received from the output FIFO 335), or it may send out the image-processed data as soon as it receives it from the output FIFO 335 without storing the data in the second memory 170.

The system control unit 360 sends a control signal (or signals) to the image processing unit 320 via a control signal line (or lines) (not shown in FIG. 3), to specify to the image processing unit 320 the type of image processing to be performed on data sent to the input FIFO 325.

A second embodiment of the invention will be described below, which involves a method by which the MFP 300 acts on data received via the fourth process and data received via one of the "Copy", "Print" or "Scan" processes. In the method according to the second embodiment, any image processing performed by the MFP 300 utilizing the fourth process is interrupted in order to perform a "Copy", "Scan" or "Print" process. The reason why this is done is because a "Copy", "Scan" or "Print" process is initiated by a user who is physically located at the MFP 300, whereby a fourth process is initiated by way of a user at a remotely-located PC that accesses the MFP 300 via the network 190, which user is likely not physically located at the MFP 300. The method according to the second embodiment allows for a user waiting at the MFP 300 to obtain his or her document without having to first wait for a remotely-sent job to the MFP 300 to be completed.

Figure 4:
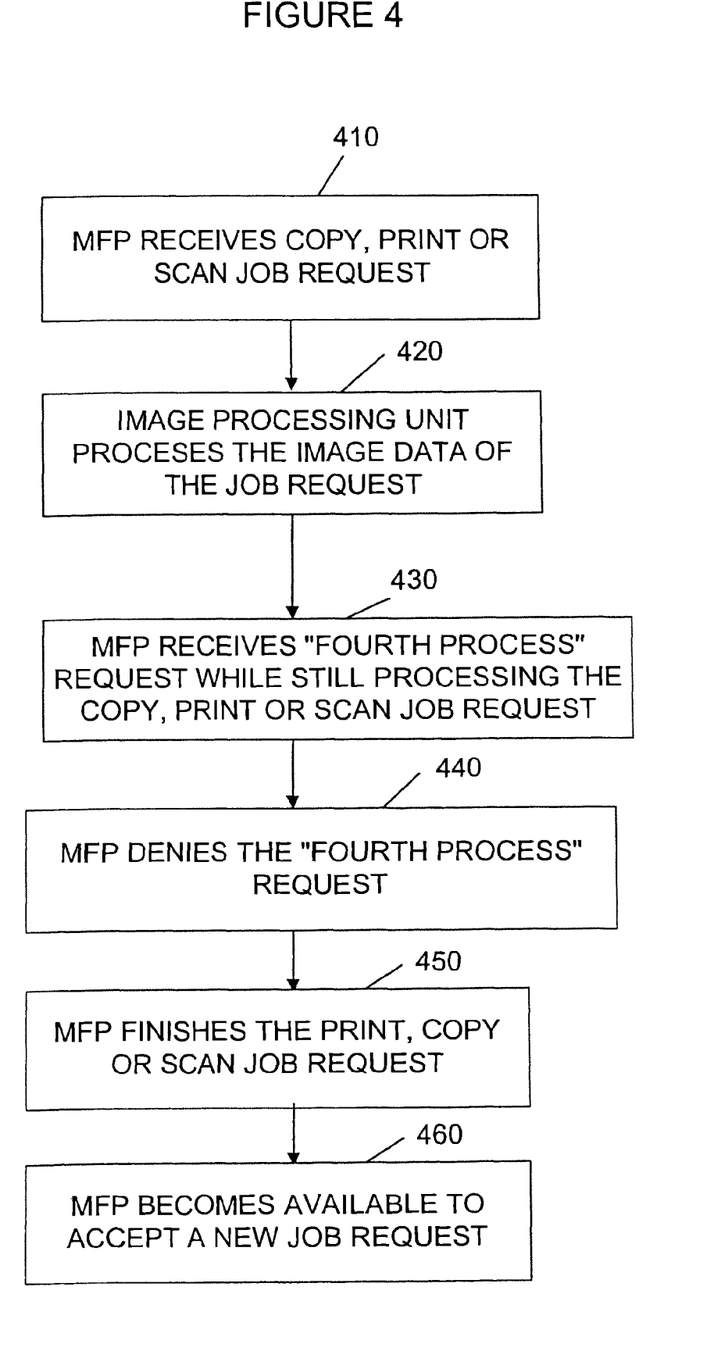
FIG. 4 is a flow diagram of a process for handling job requests for an MFP according to a second embodiment of the invention.

FIG. 4 provides a block diagram of the method according to the second embodiment. In a first step 410, the MFP 300 receives a job request that corresponds to either a "Copy", "Print" or "Scan" request. In a second step 420, the image processing unit 320 of the MFP 300 processes the image data of the job request. In a third step 430, the MFP 300 receives an image processing request (that is, a "fourth process" request as outlined above) sent over the network 190, while the MFP 300 is processing the image data of the "Copy", "Print" or "Scan" job request. In a fourth step 440, the system control unit 360 denies the "fourth process" request, since it is a lower priority than the current job request being performed. In a fifth step 450, the MFP 300 completes the image processing of the "Copy", "Print" or "Scan" job request. In a sixth step 460, the system control unit 360 becomes available to receive any new job requests. This includes "fourth process" requests, which in turn includes the fourth process request previously denied if it still needs to be completed.

In the second embodiment, any "fourth requests" received by the MFP 300 (via the network 190) are denied if the MFP 300 is currently performing either a "Scan", "Copy" or "Print" job request.

Figure 5:
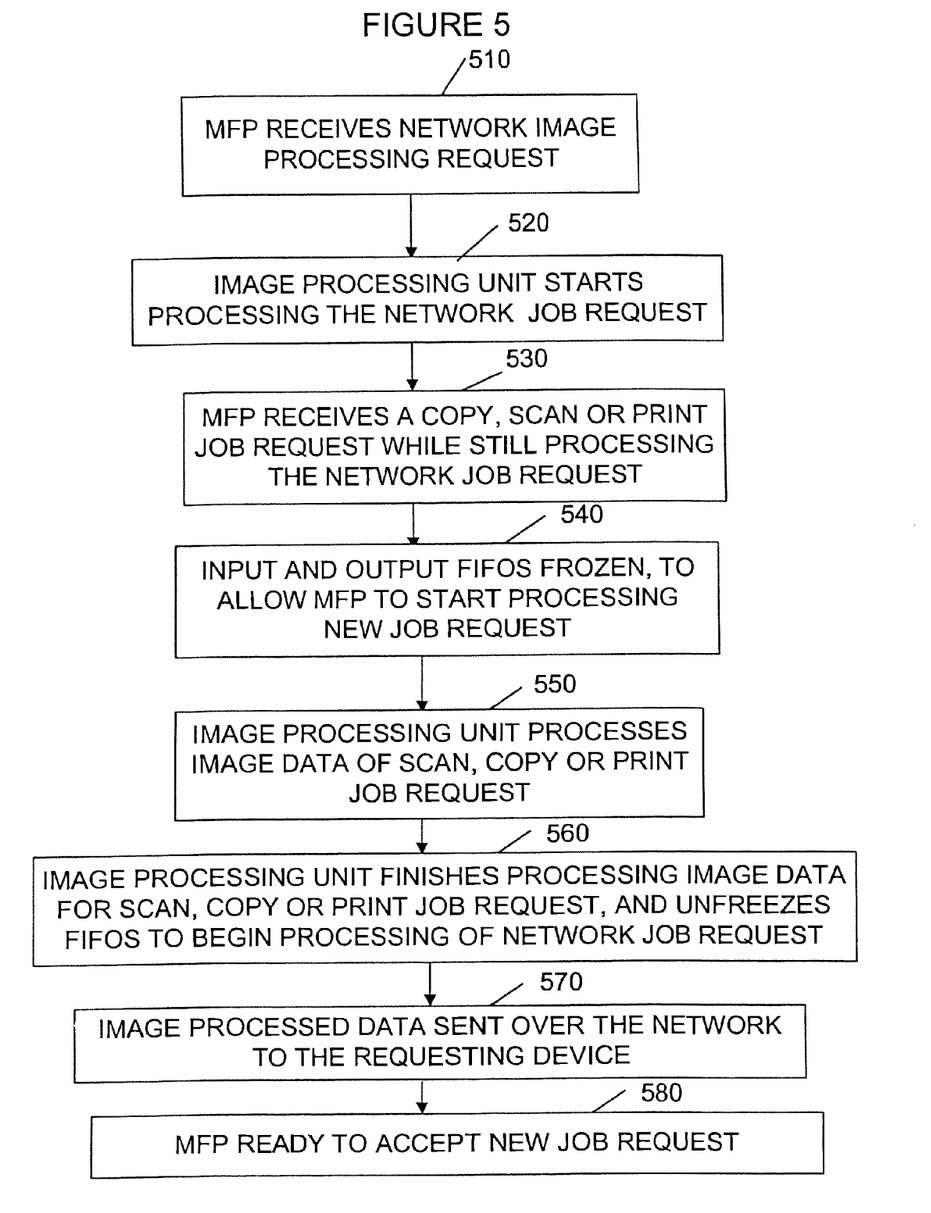
FIG. 5 is a flow diagram of a process for handling job requests for an MFP according to a third embodiment of the invention.

FIG. 5 shows a method according to a third embodiment of the invention. In a first step 510, the MFP 300 receives a network image processing request (that is, a "fourth process" request). In a second step 520, the image processing unit 320 of the MFP 300 starts image processing of the "fourth process" request. In more detail, the image processing unit 320 receives the image data from the system control unit 360, one line at a time, by way of the input FIFO 325, processes the received image data (e.g., performs binarization, gamma correction, etc.), and then provides the image-processed data to the system control unit 360 by way of the output FIFO 335, one line at a time.

In a third step 530, the MFP 300 receives another job request, whereby that other job request is either a "Scan", "Copy" or "Print" job request from a user physically present at the MFP (that is, it is not a fourth process request). In a fourth step 540, the system control unit freezes the input FIFO 325 and the output FIFO 335, whereby no new data is clocked into or out from the input FIFO 325 (and thus no new data is provided to the image processing unit 320 from the input FIFO 325), and no image-processed data is clocked out from the output FIFO 335 to the system control unit 360. With the input FIFO 325 and the output FIFO 335 in the "freeze" state, the image processing unit 320 is ready to act on the other "non-fourth process" job request immediately.

Figure 6:
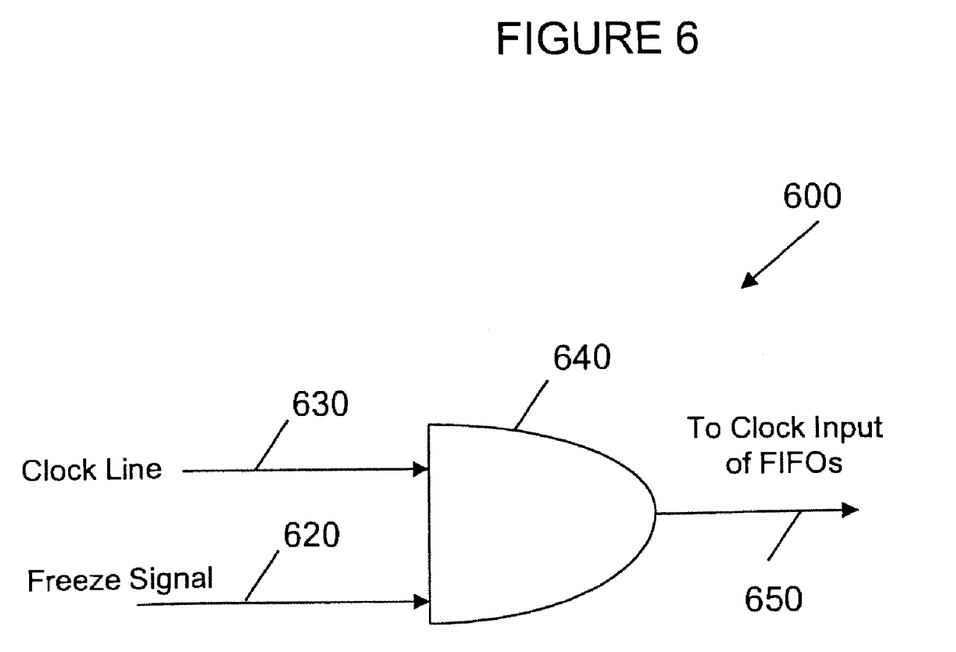
FIG. 6 is a circuit diagram of one possible implementation to freeze or unfreeze the input and output FIFOs, according to the different embodiments of the invention.

FIG. 6 shows one possible circuit implementation to freeze the FIFOs 325, 335. The system control unit 360 activates the freeze states by switching a freeze signal line 620 (a control signal output by the system control unit 360) from its normal low (logic level "0") state to a high (logic level "1") state. With the freeze signal 620 and a clock signal 630 provided to the respective input ports of an AND gate 640, an output 650 of the AND gate 640 is provided to the clock input of the input and output FIFOs 325, 335, to either freeze them or to allow data to be clocked in and out of them. Alternative circuits for achieving the freezing as understood in the art can be implemented.

In a fifth step 550, the image processing unit 320 processes the image data of the "Scan", "Copy" or "Print" job request. These requests can be carried out just as conventional MFP carries out such image processing (that is, the first and output FIFOs 325, 335 need not be utilized).

In a sixth step 560, when the processing of the image data of the "Scan", "Copy" or "Print" job request is complete, the system control unit 360 "unfreezes" the first and output FIFOs 325, 335, so that the "fourth process" job request can take over and continue from where it was interrupted by the other job request.

In a seventh step 570, the system control unit 360 then sends the image-processed data over the network 190 to the PC that initiated the fourth request.

In an eighth step 580, when the fourth request is complete, the MFP 300 goes into a ready state to receive a new job request.

In the third embodiment, any "Scan", "Print" or "Copy" job requests that are received while the MFP 300 performs a "fourth request" that precedence over the "fourth request", and the "fourth request" is halted, or frozen, until the other job request is complete. The fourth request then takes over from the place where it was halted.

Alternative embodiments can be envisioned based on the teachings above. For example, the "fourth process" requests may be controlled in terms of priority of requests, such that the scan, print or copy job requests will not take precedence over high priority network requests, and the user making such scan, print or copy requests are notified that the MFP is currently being used and the MFP indicates the expected wait time (or gives the user an override option).

The foregoing description of preferred embodiments of the invention has been presented for purposes of illustration and description. It is not intended to be exhaustive or to limit the invention to the precise form disclosed, and modifications and variations are possible in light in the above teachings or may be acquired from practice of the invention. The embodiments were chosen and described in order to explain the principles of the invention and as practical application to enable one skilled in the art to utilize the invention in various embodiments and with various modifications are suited to the particular use contemplated. Aspects of the different embodiments can be combined. It is intended that the scope of the invention be defined by the claims appended hereto and their equivalents.

What is claimed is:

1. An image processing apparatus, comprising:
    an image recording unit configured to print an image based on a first image data;
    an image processing unit configured to perform an image processing to a scanned image data to generate the first image data;
    a scanner configured to generate the scanned image data by reading an original;
    a system control unit configured to receive a job request including a second image data via a network, configured to direct the image processing unit to perform the image processing to the second image data to generate a third image data, and configured to send the third image data back over the network; and
    a first memory configured to store the first image data,
    wherein the first image data in the first memory is transferred back to the image processing unit, and the image recording unit prints the image based on the first image data transferred back to the image processing unit from the first memory, and
    wherein the first memory is a random access memory.

2. The apparatus of claim 1, wherein the first memory is a page memory to store the first image data in units of a page.

3. An image processing apparatus, comprising:
    an image recording unit configured to print an image based on a first image data;
    an image processing unit configured to perform an image processing to a scanned image data to generate the first image data;
    a scanner configured to generate the scanned image data by reading an original;
    a system control unit configured to receive a job request including a second image data via a network, configured to direct the image processing unit to perform the image processing to the second image data to generate a third image data, and configured to send the third image data back over the network; and
    a second memory configured to store the first image data,
    wherein the first image data in the second memory is transferred to the system control unit and the system control unit sends the first image data over the network
    wherein the second memory is a hard disk drive.

4. The apparatus of claim 3, wherein the second memory stores the first image data in units of a page.

5. The apparatus of claim 3,
    wherein the first image data in the second memory is transferred back to the image processing unit, and the image recording unit prints the image based on the first image data transferred back to the image processing unit from the second memory.

6. An image processing apparatus, comprising:
    an image recording unit configured to print an image based on a first image data;
    an image processing unit configured to perform an image processing to a scanned image data to generate the first image data;
    a scanner configured to generate the scanned image data by reading an original;
    a system control unit configured to receive a job request including a second image data via a network, configured to direct the image processing unit to perform the image processing to the second image data to generate a third image data, and configured to send the third image data back over the network,
    wherein the system control unit denies the job request during the image processing unit performing the image processing to the scanned image data to generate the first image data;
    a second memory configured to store the job request during the image processing unit performing the image processing to the scanned image data to generate the first image data, and
    wherein the system control unit directs the image processing unit to perform the image processing to the second image data in the network job request stored in the second memory to generate a third image data after the image processing unit performs the image processing to the scanned image data to generate the first image data.

* * * * *